United States Patent [19]

Faivre et al.

[11] Patent Number: 5,608,392
[45] Date of Patent: Mar. 4, 1997

[54] AIRCRAFT COLLISION-AVOIDANCE DEVICE, NOTABLY GROUND COLLISION, BY CONTROL OF ANGLE OF DESCENT

[75] Inventors: François Faivre; Xavier Denoize, both of St. Medard en Jalles, France

[73] Assignee: Sextant Avionique, Meudon La Foret, France

[21] Appl. No.: 408,922

[22] Filed: Mar. 22, 1995

[30] Foreign Application Priority Data

Mar. 22, 1994 [FR] France .................................. 94 03343

[51] Int. Cl.$^6$ ................................................ G08B 23/00
[52] U.S. Cl. .......................... 340/967; 244/186; 340/963; 364/448
[58] Field of Search ..................................... 340/963, 967, 340/970, 961, 976, 979, 988, 990, 974, 975; 364/424.06, 435, 439, 447, 448, 449, 461; 244/183, 186; 73/178 R, 178 T

[56] References Cited

U.S. PATENT DOCUMENTS

| | | |
|---|---|---|
| 3,752,967 | 8/1973 | Victor . |
| 3,922,637 | 11/1975 | Bateman . |
| 4,164,340 | 8/1979 | Simpson . |
| 4,399,425 | 8/1983 | Taylor ...................... 340/979 |
| 4,567,483 | 1/1986 | Bateman et al. ........................ 340/970 |
| 4,646,244 | 2/1987 | Bateman et al. ........................ 340/963 |
| 4,675,823 | 6/1987 | Noland .................... 340/970 |
| 4,792,906 | 12/1988 | King et al. .............................. 364/448 |
| 4,796,190 | 1/1989 | Cummings .............................. 364/449 |
| 4,914,436 | 4/1990 | Bateman et al. ........................ 340/970 |
| 5,414,631 | 5/1995 | Denoize et al. ......................... 340/963 |
| 5,420,582 | 5/1995 | Kubbat et al. ........................... 340/974 |
| 5,475,594 | 12/1995 | Oder et al. ......................... 364/424.06 |
| 5,488,563 | 1/1996 | Chazelle et al. ........................ 340/970 |

FOREIGN PATENT DOCUMENTS

0565399A1  10/1993  European Pat. Off. .

*Primary Examiner*—Brent A. Swarthout
*Attorney, Agent, or Firm*—Oblon, Spivak, McClelland, Maier & Neustadt, P.C.

[57] ABSTRACT

The disclosure is an aircraft collision-avoidance device used notably during landing approach. The device includes at least means of fixing the position of the aircraft, a database, first means of comparison, means of extraction of the point of touch-down on the runway, means of calculating the real glide slope vector of the aircraft, means of extraction of the theoretical glide slope vector of the aircraft, and second means of comparison used to compare the real and theoretical slope vectors. It is applicable in particular to airliners during final approach to landing.

8 Claims, 3 Drawing Sheets

FIG. 3
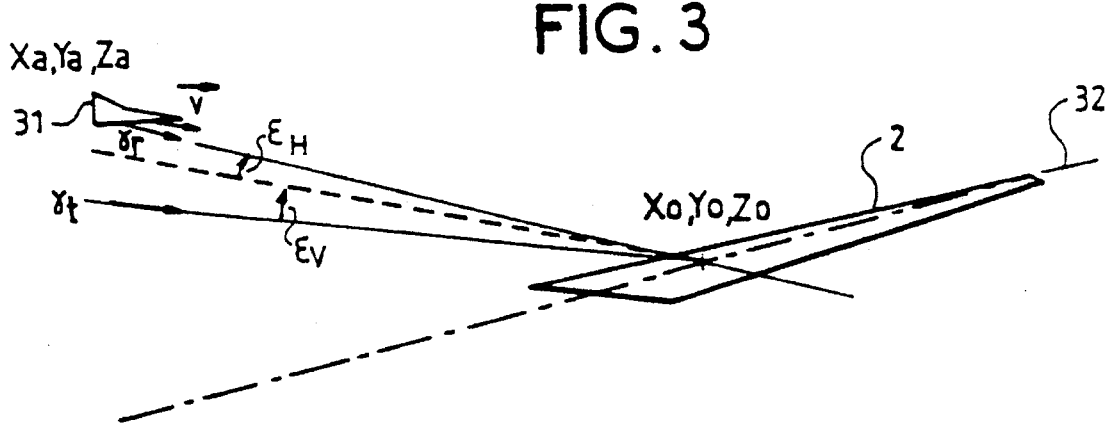
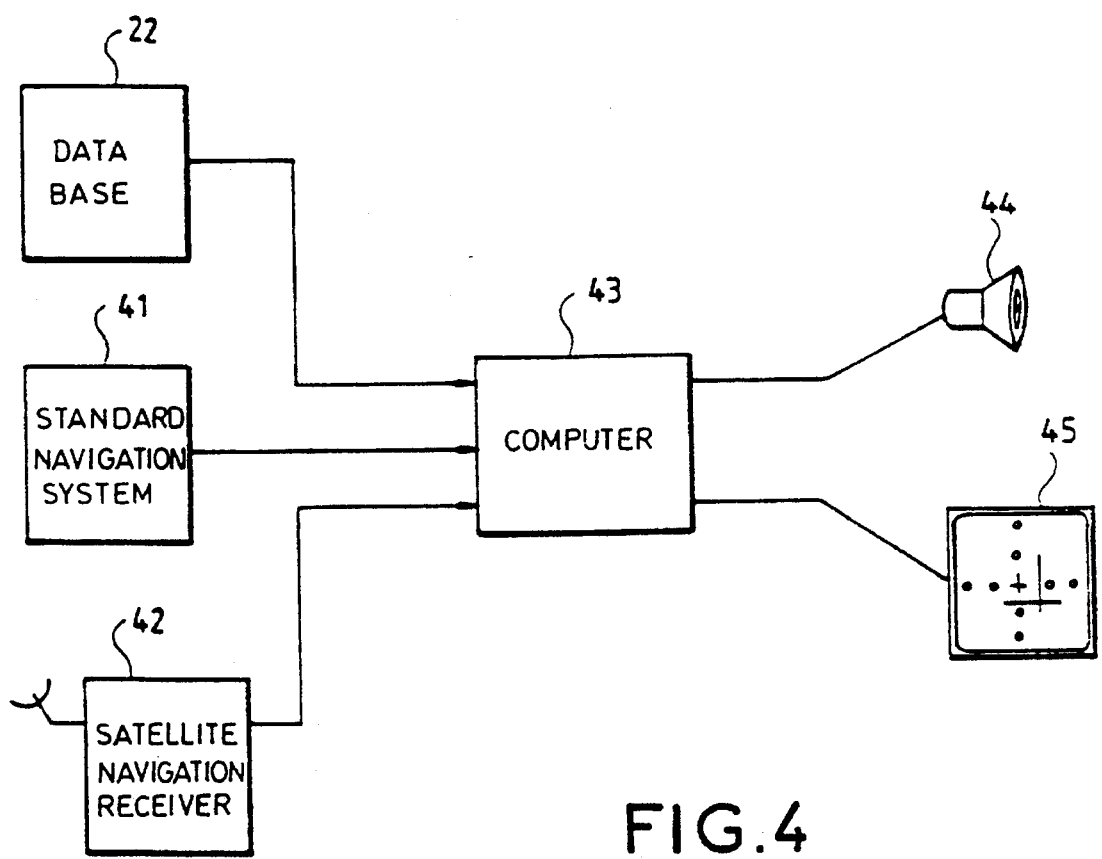
FIG. 4

AIRCRAFT COLLISION-AVOIDANCE DEVICE, NOTABLY GROUND COLLISION, BY CONTROL OF ANGLE OF DESCENT

BACKGROUND OF THE INVENTION

The present invention concerns an aircraft collision-avoidance device, used notably to avoid ground collision by controlling the angle of descent. It is applicable in particular to airliners during final approach to landing. More generally, it is applicable to all aircraft which, during their missions, must fly close to the ground, for example, close to mountains, or make significant changes in altitude in areas where there is a risk of ground collision, whether the aircraft be in take-off phase, level flight or landing.

Ground collision-avoidance devices already exist and they are characterized mainly by their use of radio-altimeters and computers giving the barometric height based on measurements of pressure and temperature, and navigation means such as inertial systems or flight management systems. The principle of such devices lies in the use of an altimetric height, measured with respect to the ground, in association with variations of altimetric or barometric height. The use of barometric height variations is preferred over altimetric variations owing to their better precision at large altitudes. The distance from the ground is compared with a threshold value which depends on the height and configuration of the aircraft, allowing for the position of the undercarriage, flaps or nose, for example. When the measured data, notably height and its variation as a function of time, exceed certain thresholds a warning signal is sent to the crew. However, such devices tend to generate the warnings too late to enable the crew to react in time to avoid a collision. Another disadvantage of known devices is that they frequently trigger false alarms, for example when over-flying, at safe altitude, ground with localized peaks which in fact present no danger. This problem seriously reduces the credibility of such collision-avoidance devices.

Improvements have been made to these devices, in particular by introducing databases enabling the threshold values to be modulated as a function of the geographic location of the aircraft, thus reducing the number of false alarms. However, the database must be adapted to each type of terrain. In the future, we could anticipate systems equipped with digital models of the ground, enabling the position of the aircraft and the nature of the ground over which it will be flying to be known at all times. Nevertheless the use of such models requires databases of sufficient precision, which implies considerable memory capacity. Furthermore, the problems of data input and update of such systems complicates their use and, in view of the large volumes of data to be memorized, the risk of error is non-negligible.

Finally, another problem is that in order to limit the risk of false alarms known collision-avoidance devices are frequently disabled by the crew below a certain altitude, notable during approach to landing, since the aircraft must by necessity approach the ground while maintaining a substantially straight flight path, notably avoiding vertical changes in altitude owing to the presence of obstacles on the ground.

SUMMARY OF THE INVENTION

The purpose of the present invention is to overcome these disadvantages, notably by avoiding problems related to the variations of ground relief, by fixing the position of the aircraft not in terms of its height above the ground but in relation to known safe altitudes, the device being operational until touch-down and controlling the gradient of the flight path leading to the landing runway.

The object of the invention is therefore an aircraft collision-avoidance device, used during approach to a landing strip, that includes at least:

means of fixing the position of the aircraft;

a database containing data describing said landing strip and its landing procedures;

first means of comparison, connected to said position-fixing means and said database, that compare the aircraft's position with information in the database;

means of extraction from said database of the point of touch-down on said landing strip, connected to said first means of comparison;

means of calculating the real glide slope vector of the aircraft, connected to said means of extraction;

means of extraction of the theoretical glide slope vector of the aircraft from said database;

second means of comparison, connected to said means of calculating the real glide slope vector of the aircraft and to said means of extraction of the theoretical glide slope vector of the aircraft, that compare the real and theoretical glide slope vectors.

The main advantage of the invention is that it enables the risks associated with deviations from the flight path (and therefore the risk of collision) to be predicted, thereby reducing the reaction time of the crew in the face of such risks. The invention also reduces the number of false alarms, improves the reliability of the collision-avoidance, is adaptable to any type of terrain, airspace and navigational constraints. Finally it does not require the support of ground-based landing guidance systems.

BRIEF DESCRIPTION OF THE DRAWINGS

Other characteristics and advantages of the invention will become apparent on reading the following description with reference to the attached drawings which represent:

FIG. 3: an aircraft during landing approach;

FIG. 4: example of an embodiment of a device according to the invention.

DESCRIPTION OF THE INVENTION

Figure 1:
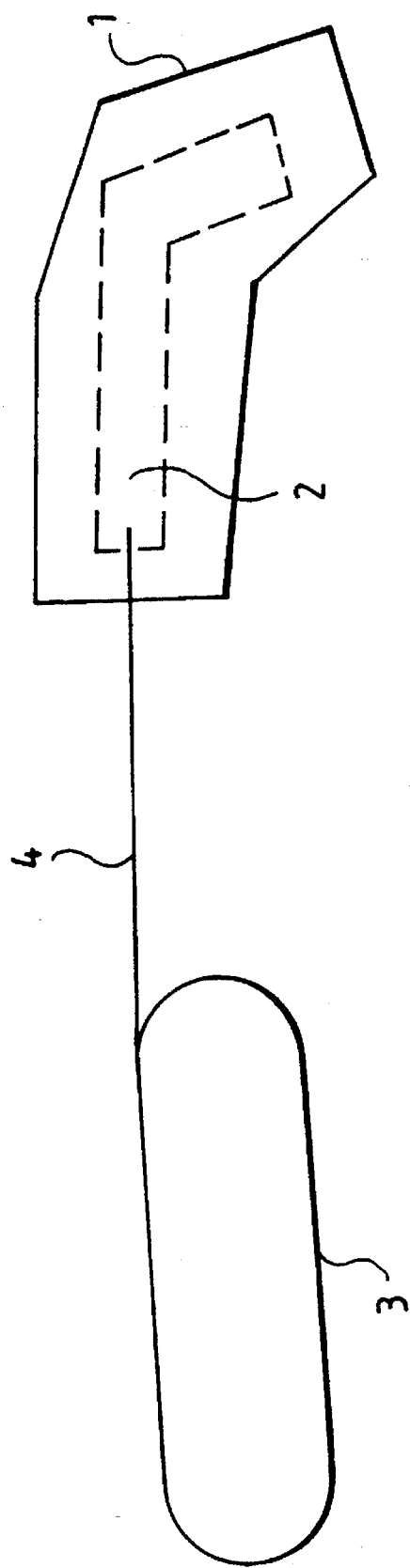
FIG. 1: example of the application of a device according to the invention.
Figure 2:
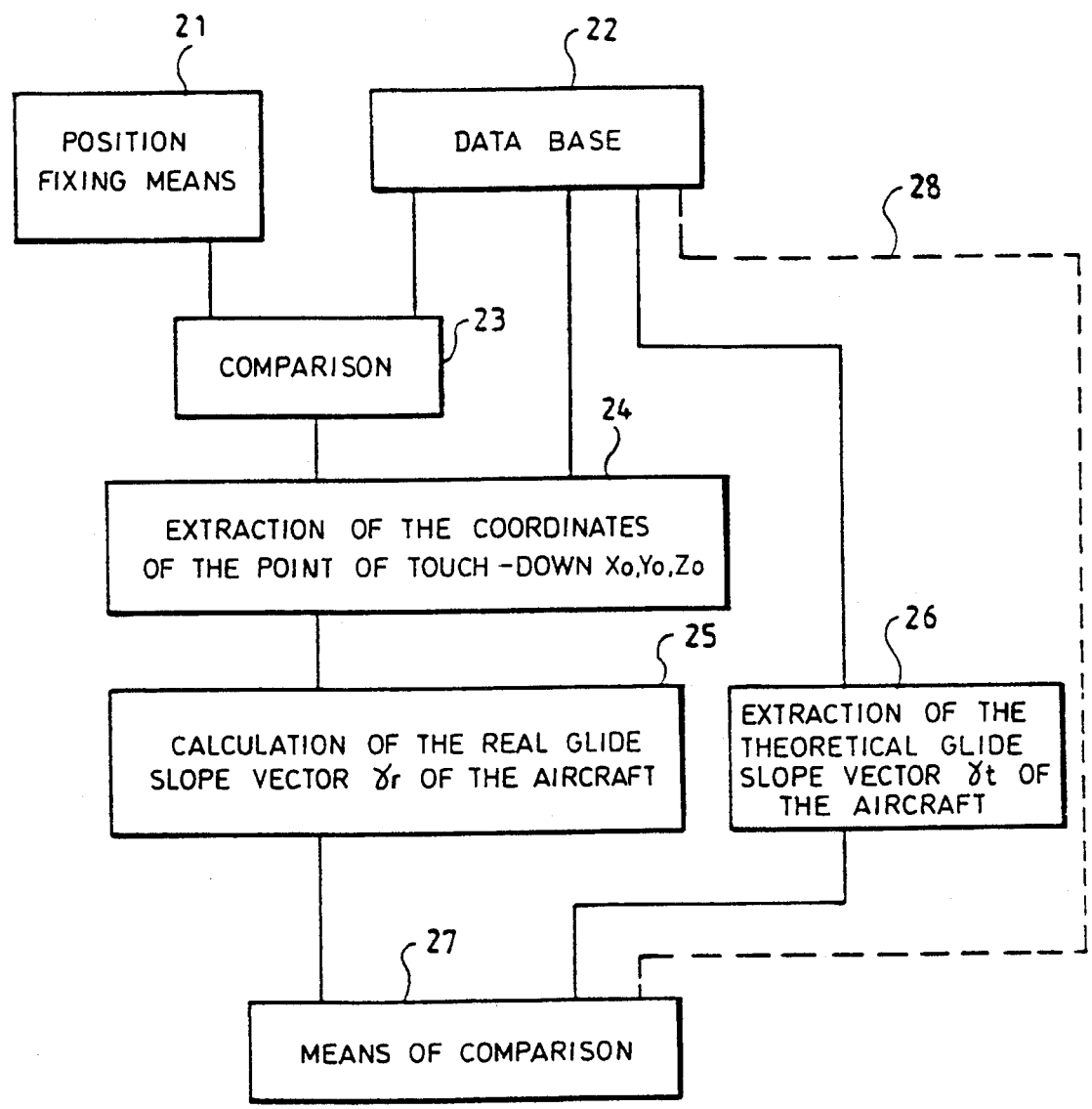
FIG. 2: block diagram of a device according to the invention.

FIG. 1 shows an example of the application of a device according to the invention, in which an aircraft is landing at an airport 1. FIG. 2 gives a block diagram of a device according to the invention. The device includes position-fixing means 21 used to determine the position of the aircraft to which the device is fitted, expressed by its three Cartesian coordinates in space. The device also includes a database 22 containing for example information describing airport runways and landing procedures, for airports world-wide or only the ones where the aircraft might go. More precisely, the database 22 contains data defining the altitude threshold of the runway 2, the alignment of the runway and the angle of descent imposed by the landing procedure, for all the runways in the database.

At regular intervals, for example, the first means of comparison 23 compare the position of the aircraft with the information in the database 22, the means of comparison 23 being connected to this database and to the position-fixing means 21. When the result of this comparison reveals the presence of an airport 1 nearby, as expected in the flight plan, this plan having been memorized for example in the position-fixing means 21 or any other means of memorization, the means of extraction 24 provide the coordinates $X_o$, $Y_o$, $Z_o$ of the point of touchdown on the runway. Before making its approach the aircraft can follow a holding airway 3 before entering the corridor 4 for landing on the runway 2.

FIG. 3 shows an aircraft 31 during its landing approach. The position-fixing means 21 provide in particular the spatial coordinates $X_a$, $Y_a$, $Z_a$ of the aircraft 31 whose velocity is V. The means of extraction 24 of the coordinates provide the coordinates $X_o$, $Y_o$, $Z_o$ of the point of touchdown on the runway. These coordinates are, for example, memorized in the database 22. In order to extract these data, the means of extraction 24 are connected to this database 22. The means of calculation 25 of the real glide slope vector $\gamma_r$ of the aircraft 31 are connected to the means of extraction 24. The components of this vector are proportional to the coordinate differences $X_a-X_o$, $Y_a-Y_o$, $Z_a-Z_o$.

The means of extraction 26 of the theoretical glide slope vector $\gamma_t$ of the aircraft are connected to the database 22. These means 26 then extract from the database 22 the theoretical vector $\gamma_t$ that the aircraft 31 should have, taking into account the landing procedure on the chosen runway. In the example shown in FIG. 2, the means of extraction 26 of the theoretical glide slope are used to calculate the theoretical slope vector $\gamma_t$ for the aircraft 31 landing on runway 2.

The second means of comparison 27 are connected to the means 25 of calculation of the real glide slope vector and to the means of extraction 26 of the theoretical glide slope vector $\gamma_t$. These second means 27 compare these two vectors $\gamma_r$ and $\gamma_t$, for example calculating the horizontal deviation $\epsilon_h$ and the vertical deviation $\epsilon_v$, then comparing $\epsilon_h$ with a first threshold and comparing $\epsilon_v$ with a second threshold. The means of comparison 27 could, for example, display the deviations $\epsilon_h$ and $\epsilon_v$ on a display visible to the crew. When $\epsilon_h$ becomes greater than the first threshold a warning signal could be triggered. This signal could, for example, be transmitted to the crew by visual or audible means. Such a signal can in this case provide an "approach control warning". When $\epsilon_v$ becomes greater than the second threshold a warning signal could be triggered. This signal could, for example, be transmitted to the air crew by visual or audible means. Such a signal can in this case provide a "terrain avoidance warning". These first and second thresholds with which $\epsilon_h$ and $\epsilon_v$ are compared are either known theoretical values or values obtained from the database 22. In the latter case, a connection 28 is necessary between the database 22 and the second means of comparison 27.

In order to limit the risk of false alarms, the device according to the invention could be put out of service, except when the aircraft is below a certain height. Above this height any type of ground collision-avoidance system can be used.

In addition to the means shown in FIG. 2, the device includes, for example, means enabling it to compare the aircraft's heading with the alignment 32 of the runways of the airport. If none of the runways in the vicinity of the aircraft coincide with the aircraft's heading a warning signal, for example, could be triggered.

These means also enable the runway that the aircraft is approaching to be evaluated, which would then enable the means of extraction in the device according to the invention to take into account the parameters and procedures corresponding to this identified runway.

FIG. 4 shows a possible embodiment of a device according to the invention. The position-fixing means 21 comprise, for example, a standard navigation system 41 and a satnav receiver 42, the latter being used principally to improve the precision of the position fixing.

The first means of comparison 23, the means of extraction 24 of the touch-down position on the runway, the means 25 of calculation of the real glide slope vector of the aircraft, the means 26 of extraction of the theoretical glide slope vector, the second means of comparison 27 and the means of comparison of the aircraft heading with the runway alignment are included, for example, in a computer 43 connected to the database 22, to the standard navigation system 41 and to the satnav receiver 42. The computer 43 is, for example, connected to audible means 44 to which warning signals are sent when necessary. The computer 43 is also connected, for example, to means of display 45 showing deviation and guidance information provided by the computer and any warning messages.

The device according to the invention assures the ground-collision avoidance function at low altitudes efficiently and with a low probability of false alarms. This function can be assured at all airports for a very modest investment in ground equipment. In fact, the device could be used without any supporting ground devices at each runway or at each airport, although the performance of the system will be improved if local or regional ground stations are provided.

The embodiment above describes a device according to the invention used during landing. However, a device according to the invention can also be of use during take-off, notably in order to assure that the climb gradient complies with the airport rules. More generally, the device according to the invention can be applied during all flight phases involving inclined flight paths.

What is claimed is:

1. An aircraft collision-avoidance device comprising:

means for producing a first three-dimensional coordinate representative of an aircraft position;

a database configured to hold database information comprising, a three-dimensional theoretical glide slope vector, a second three-dimensional coordinate representative of a touchdown point of a landing strip, a first threshold value, a second threshold value, and an airport position;

means for comparing said aircraft position and said database information to determine if said aircraft is near said airport;

means for extracting a second three-dimensional coordinate from said database information when said aircraft position is near said airport;

means for calculating a three-dimensional real glide slope vector based on said first three-dimensional coordinate and said second three-dimensional coordinate; and means for producing a collision-avoidance signal corresponding to said three-dimensional real glide slope vector and said three-dimensional theoretical glide slope vector, said means for producing further comprising, means for calculating a horizontal deviation value between said three-dimensional real glide slope vector and said three-dimensional theoretical glide slope vector, means for calculating a vertical deviation value between said three-dimensional real glide slope vector and said three-dimensional theoretical glide slope vector, and means for outputting said collision-avoidance signal when at least one of said horizontal deviation value is greater than said first threshold value and said vertical deviation value is greater than said second threshold value.

2. The device according to claim 1, wherein said means for producing a collision-avoidance signal produces a warning signal when at least one of said horizontal deviation value exceeds said first threshold value and said vertical deviation value exceeds said second threshold value.

3. The device according to claim 1, further comprising means for activating said collision-avoidance device when said aircraft position is below a predetermined altitude.

4. The device according to claim 1, further comprising:
said database information comprising an alignment of said landing strip; and
means for comparing an aircraft heading with said alignment of said landing strip.

5. The device according to claim 1, wherein said means for producing the first three-dimensional coordinate includes at least one of a standard navigation device and a satellite navigation device.

6. The device according to claim 1, further comprising a computer, said computer comprising:
said means for comparing said aircraft position and said database information;
said means for extracting said second three-dimensional coordinate;
said means for calculating said three-dimensional real glide slope vector; and
said means for producing a collision-avoidance signal.

7. The device according to claim 1, wherein said landing strip is a selected one of a plurality of airport runways.

8. A method for producing an aircraft collision-avoidance signal, comprising the steps of:

producing a first three-dimensional coordinate representative of an aircraft position;

holding database information comprising,
a three-dimensional theoretical glide slope vector corresponding to a landing strip,
a first threshold value,
a second threshold value, and
an airport position;

comparing said aircraft position and said database information;

determining if said aircraft position is near said airport;

extracting a second three-dimensional coordinate representative of a touchdown position of said landing strip from said database information when said determining step determines said aircraft position is near said airport;

calculating a three-dimensional real glide slope vector based on said first three-dimensional coordinate and said second three-dimensional coordinate; and producing a collision-avoidance signal corresponding to said three-dimensional real glide slope vector and said three-dimensional theoretical glide slope vector, said producing step further comprising the steps of,
calculating a horizontal deviation value between said three-dimensional real glide slope vector and said three-dimensional theoretical glide slope vector,
calculating a vertical deviation value between said three-dimensional real glide slope vector and said three-dimensional theoretical glide slope vector,
comparing said horizontal deviation value with said first threshold value,
comparing said vertical deviation value with said second threshold value, and
outputting said collision-avoidance signal when at least one of said horizontal deviation value is greater than said first threshold value and said vertical deviation value is greater than said second threshold value.

* * * * *